(12) United States Patent
Koten

(10) Patent No.: US 8,011,911 B2
(45) Date of Patent: Sep. 6, 2011

(54) METHOD AND SYSTEM FOR PELLETIZING SULFUR

(75) Inventor: Jean-Marie Koten, Tyler, TX (US)

(73) Assignee: Brimcock International Inc., Kilgore, TX (US)

( * ) Notice: Subject to any disclaimer, the term of this patent is extended or adjusted under 35 U.S.C. 154(b) by 0 days.

(21) Appl. No.: 12/644,183

(22) Filed: Dec. 22, 2009

(65) Prior Publication Data

US 2010/0098796 A1 Apr. 22, 2010

Related U.S. Application Data

(63) Continuation of application No. 11/977,827, filed on Oct. 26, 2007, now Pat. No. 7,638,076.

(51) Int. Cl.
*B29B 9/10* (2006.01)

(52) U.S. Cl. .................. 425/6; 425/10; 264/13; 264/14

(58) Field of Classification Search .................. None
See application file for complete search history.

(56) References Cited

U.S. PATENT DOCUMENTS

| | | | | |
|---|---|---|---|---|
| 2,811,748 A | * | 11/1957 | Smith | 264/13 |
| 2,923,033 A | * | 2/1960 | Baldwin et al. | 264/3.5 |
| 3,210,443 A | * | 10/1965 | Reddie et al. | 264/14 |
| 3,334,159 A | * | 8/1967 | Campbell | 264/13 |
| 4,133,669 A | * | 1/1979 | Caldwell et al. | 71/54 |
| 4,149,837 A | * | 4/1979 | Baker et al. | 425/10 |

* cited by examiner

*Primary Examiner* — Mary Lynn F Theisen
(74) *Attorney, Agent, or Firm* — Strasburger & Price, LLP

(57) ABSTRACT

Relatively uniform spherical shaped solid pellets (prills) may be created by passing molten sulfur through a nested strainer to remove particles that would otherwise become trapped in the system, a drip tray with a heating channel attached on its underside, an injection conduit for delivery of a cooled zone of water to create solid prills, and thereafter moving the prills through a stationary curved screen to remove most of the excess water and a vibrating screen.

32 Claims, 16 Drawing Sheets

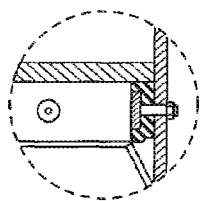
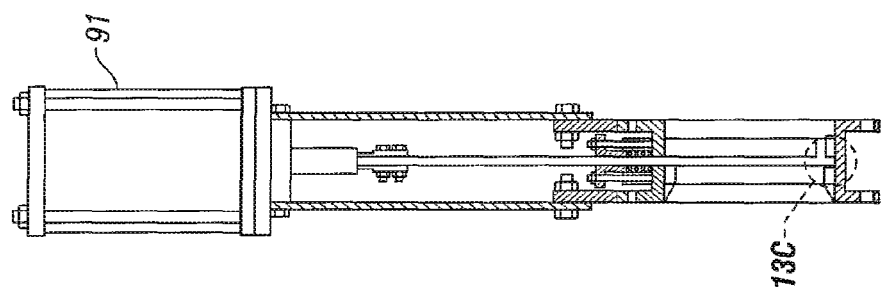
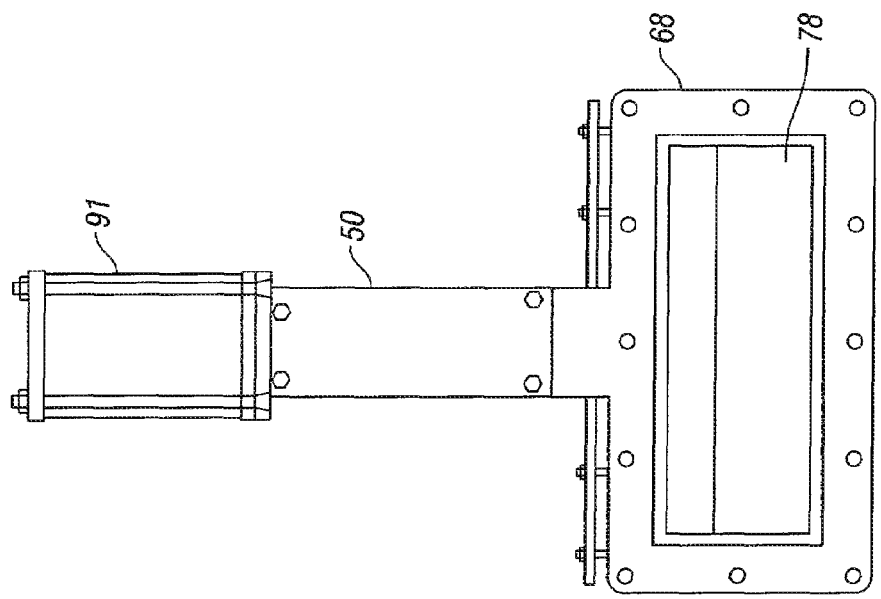

METHOD AND SYSTEM FOR PELLETIZING SULFUR

CROSS-REFERENCE TO RELATED APPLICATIONS

This application is a continuation of U.S. application Ser. No. 11/977,827 filed on Oct. 26, 2007, now U.S. Pat. No. 7,638,076, which is hereby incorporated by reference for all purposes in its entirety.

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

This invention generally relates to the field of converting molten sulfur (or sulphur) into solid pellets (or prills).

2. Description of the Related Art

Sulfur is used in numerous products, including fertilizers, gunpowder, insecticides, fungicides, paper, and textiles. It may be extracted directly from the earth, or it may be removed from other natural substances, such as coal, natural gas, or crude oil. Liquid or molten sulfur produced as a by-product from petro-chemical refineries often contains particulate impurities known as "Carsul," which is a carbon sulfur polymer. Sulfur is usually produced, transported, and utilized within the United States in molten liquid form. It is inconvenient and expensive to store and transport sulfur in a molten form. In addition, before sulfur can be exported, generally, it has to be converted to solid form.

The prior art contains proposals for converting liquid or molten sulfur into pellets (known sometimes as "prills"). For example, "Wet" processes propose forming and solidifying droplets of sulfur in a liquid coolant. U.S. Pat. No. 4,149,837 proposes converting molten sulfur into solid pellets by passing droplets through a liquid medium at temperatures in excess of 150° F., and preferably with the liquid medium approaching the melting point of sulfur.

U.S. Pat. No. 3,649,217 proposes separating sulfur from crushed ore by passing the crushed ore containing sulfur through a hot water section in the range of 290°-320° F. that melts the sulfur, and then through a cold water section in the range of ambient to 150° F. According to the '837 patent, the quenched pellets are usually hollow, pocked with pin holes, resemble somewhat pieces of popcorn, crumble when extensively handled, and tend to retain moisture.

U.S. Pat. No. 4,133,669 proposes forming prills from a molten sulfur-bentonite mixture by passing the mixture through a liquid cooling medium comprising liquid fertilizer. The '669 patent proposes that if the liquid cooling medium was water, or contained an excessive amount of water, the mixture would not become pelletized, but would degrade and turn into "mush" as the mixture entered the water.

For maximum commercial value, sulfur prills should be generally spherical in shape, uniform in size and density, and have low moisture content. Very small or fine pieces of sulfur, commonly known as "fines," are undesirable and create an enormous maintenance problem and potential fire and safety hazards and health problems for manufacturing personnel. High moisture content is undesirable because, among other things, the customer typically pays by weight, and less sulfur is received. Further, the increased weight increases the cost of shipping, and water and sulfur may create dangerous sulfuric acid. Sulfur prills typically should have a moisture content of 1.8% to 2.2% to command maximum commercial value and be acceptable for export. Moreover, the prills typically should meet the size and uniformity criteria set forth below in Table 1.

TABLE 1

| Shape, size, and size distribution: |
| --- |
| Generally smooth and free of angularities |
| 90 percent must remain on #4 Tyler Mesh screen (4.75 mm) to #16 mesh screen (1.18 mm) |
| No material should exceed 6 mm in diameter |
| No more than 10 percent retained on the #4 mesh screen |
| No more than 10 percent should pass the #16 mesh screen |
| No more than 2 percent passing a 50 mesh screen |

A need exists for a method and system to convert liquid or molten sulfur to solid prills that produces prills meeting the size, uniformity, and moisture content criteria generally described above for maximum commercial value. The method and system would use an economical novel wet process of quenching the sulfur through a liquid medium, such as water.

BRIEF SUMMARY OF THE INVENTION

A method and system is disclosed for converting liquid sulfur into solid pellets or prills that are generally spherical in shape, without sharp edges, uniform in size and density, and have relatively low moisture content. A two-stage nested strainer removes impurities from the molten sulfur that may otherwise contribute to maintenance delays. A heated drip tray creates uniform droplets of liquid sulfur. A heating system for the drip tray is incorporated onto the underside of the tray so as to allow efficient and uniform heating while minimizing any impact on operations should a leak occur. The droplets are passed through a forming tank that contains a liquid medium, such as water. In the exemplary embodiment, the bottom portion of the forming tank funnels the prills and water through a relatively smaller opening. Relatively warm water may be injected near the bottom of the tank. A lesser amount of relatively cool water is injected through novel injection conduits near the top surface of the water. The injection conduits create a cool media zone in the top area of the forming tank where prills are initially formed. Solid prills accumulate in the bottom section of the forming tank. A sensing device detects when a sufficient number of prills have been accumulated in the forming tank, and activates a discharge gate valve to release the prills while maintaining a level of water in the forming tank to adequately continue the process. The prills exit the forming tank and traverse down a static curved screen to a vibrating screen. A multi-stage filtration system removes the fines and allows the filtered water to be re-circulated and cooled in a closed system. The prills are then transported to a medium for storage or transportation.

BRIEF DESCRIPTION OF THE DRAWINGS

A better understanding of the present invention can be obtained with the following detailed descriptions of the various disclosed embodiments in the drawings, which are given by way of illustration only, and thus are not limiting the present invention, and wherein:

FIG. 13A is a front elevational view of a discharge gate valve.

FIG. 13B is a side elevational view of the valve of FIG. 13A.

FIG. 13C is an enlarged view of the designated area of FIG. 13B.

DETAILED DESCRIPTION OF THE INVENTION

Generally, the present invention involves a method and system for converting liquid or molten sulfur to solid pellets or prills that are generally spherical in shape, are without sharp edges, uniform in size and density, and have relatively low moisture content. The method and system produce prills that generally meet the narrow size distribution and uniformity criteria set forth in Table 1 above. Although the preferred use of the method and system is for sulfur, it is also contemplated that the method and system, and any of the embodiments and components, may be used for converting other molten liquids to solid prills, such as asphalt. Although the exemplary embodiment of the method and system passes the molten sulfur through water, other fluids or cooling medium besides water, as known in the art, but novel when used herein, may be used.

Figure 1:
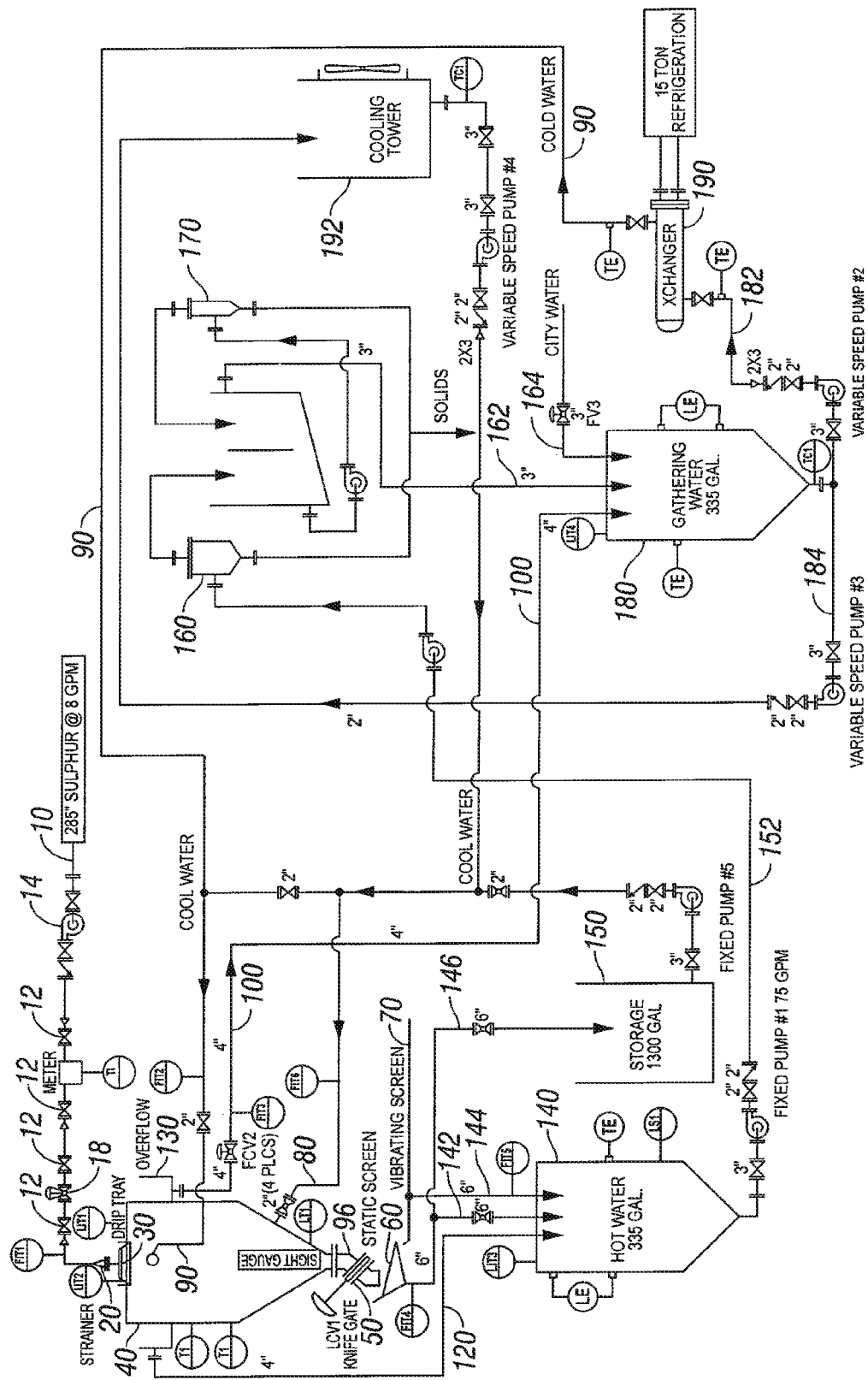
FIG. 1 is an overall schematic view of a sulfur prilling system according to the invention showing an exemplary layout of a nested strainer, a drip tray, an overflow container, a sulfur prill forming tank, a discharge gate valve, a curved screen, a vibrating screen, a filtration system for the cooling medium, a cooling system for the cooling medium, and a conduit system.

Turning to FIG. 1, block valves 12, an actuated valve 18, a flow meter 16, and a pump 14 are positioned along conduit 10. One end of conduit 10 is positioned with a nested strainer 20, wherein the strainer 20 is mounted over a drip or prilling tray 30. The liquid or molten sulfur may enter through the other end of conduit 10 and travel toward the strainer 20. The drip tray 30 may be positioned over a forming tank 40. A discharge or knife gate valve 50 may be mounted below the bottom 77 of the forming tank 40 in a discharge channel 96. A static curved screen 60 may be positioned below the forming tank 40 and the discharge gate valve 50. A vibrating screen 70 may be disposed with the curved screen 60.

A conduit 80 may be attached to a lower section 76 of the forming tank 40, and a conduit 90 may be attached below the top of the forming tank 40 in an initial prill forming zone. The lower section 76 of the forming tank 40 is constructed so as to funnel the prills (and some of the tank media, e.g., water) to the discharge channel 96. As will be discussed below in detail, in one embodiment the relatively warm water may enter the forming tank 40 through the conduit 80, and a lesser amount of relatively cool water may enter the forming tank 40 through one or more conduits 90. More than one of each of the conduits (80, 90) may communicate with forming tank 40. In one embodiment, two conduits 90 may communicate with the forming tank 40 through novel injection conduits 103, which will be described below. When the system is operating, the forming tank 40 is filled with the medium, such as water.

The water may exit the forming tank 40 through conduits (100, 120), which may each be attached on one end with an overflow container 130 attached at the top of the forming tank 40. A sensor LIT1 is positioned to maintain an overflow condition into the overflow container 130. A sensor LIT2 is positioned to maintain the desired level of molten sulfur in the drip tray 30. One end of the conduit 120 may be positioned with a tank 140. The forming tank 140 may have a funneling shaped bottom or lower section as described herein. One end of each of conduits (142, 144) may also be positioned with the tank 140. While the system is in normal operation, the conduit 142 may transport the water removed from the curved screen 60, and the conduit 144 may transport the water removed from the vibrating screen 70. One end of the conduit 146 may be positioned with a storage tank 150. The conduit 146 may be used to transport the water removed from the curved screen 60 to the tank 150 while the system is not in operation and is being maintenanced. The tank 150 may be used for temporary storage.

Hydro-cyclones (160, 170) may be positioned in series along the conduit 152. Two or more hydro-cyclones may be positioned in series. In one embodiment, four hydro-cyclones may be positioned in series. Different sized hydro-cyclones may used to remove different sized particles from thee liquid. One end of the conduit 100 may be positioned with a tank 180. One end of the conduit 162 may be also positioned with the tank 180. The tank 180 may have a conical bottom section. The conduit 162 may transport filtered water from the hydro-cyclones (160, 170). One end of the conduit 164 may be positioned with the tank 180. The conduit 164 may transport the water from an outside source to introduce new water to the process. A conduit 182 may transport the water from the tank 180 to a chilling package or cooling system 190. A conduit 184 may transport the water from the tank 180 to a cooling system 192. The cooling system 190 may be a heat exchanger and refrigeration unit, and the cooling system 192 may be a cooling tower. As can now be understood, FIG. 1 shows a closed loop sulfur prilling system in which the water may be filtered and cooled before recirculation back to the forming tank 40. As will be discussed below, level detection devices may be in the tanks (140, 180) so that a central processing unit (CPU) (not shown) may control a combination of diverting valves and variable speed pumps to maintain appropriate water levels and pressures at all times.

Figure 2:
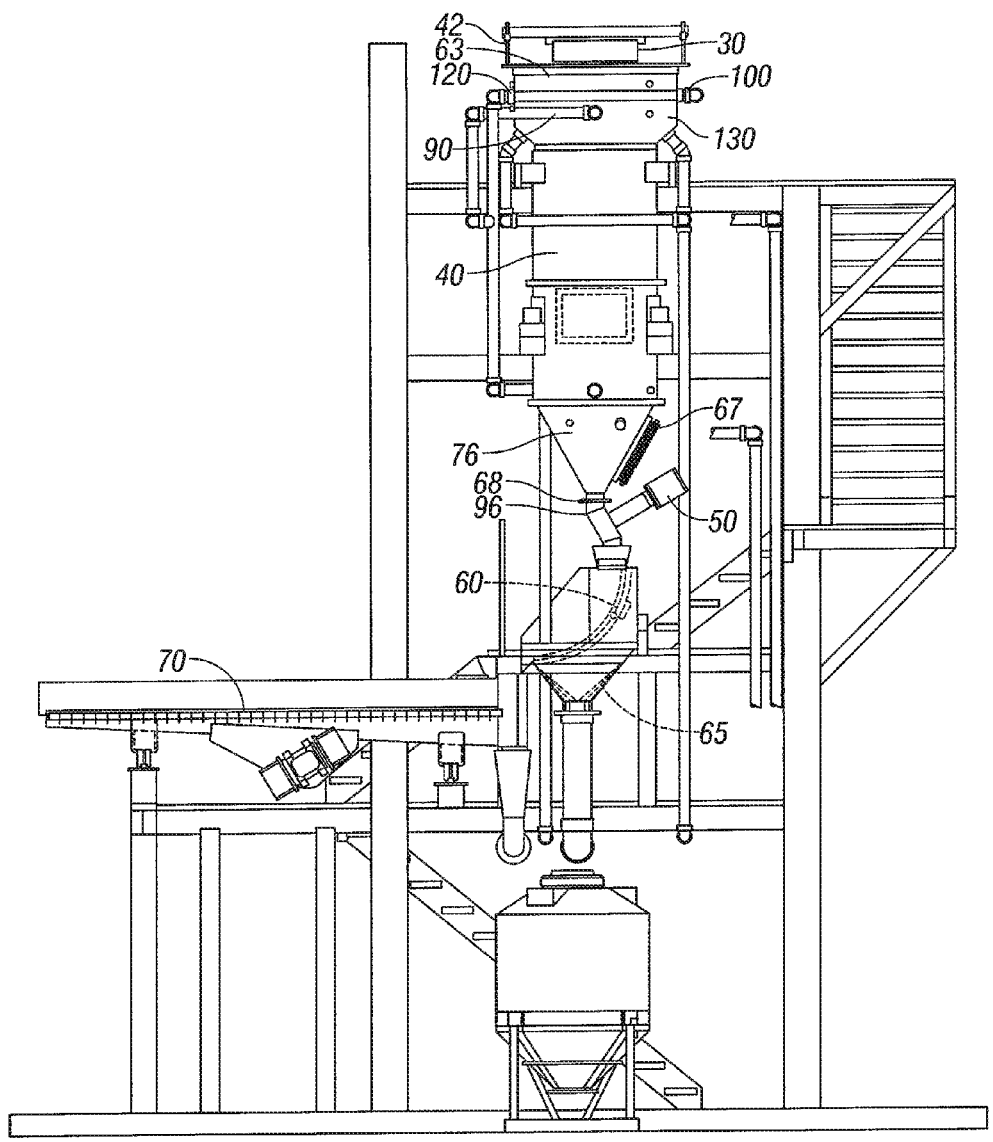
FIG. 2 is a side elevational view of a prill tray mounted on an overflow container and positioned over a forming tank, a discharge gate valve positioned below the bottom of the tank, and a curved and a vibrating screen disposed together below the discharge gate valve.

Turning to FIG. 2, a drip tray 30 may be positioned over a top 63 of the forming tank 40 using leveling fasteners such as threaded rods 42 attached with the overflow container 130. The drip tray 30 can be removed and replaced for easy maintenance. The overflow container 130 may be attached to the forming tank 40 and extend over its top 63. One end of each of conduits (100, 120) may be attached with and extend from the overflow container 130. One end of conduit 90 may be attached with the forming tank 40. In one embodiment, another conduit 90 may be attached with the forming tank 40 on the opposite side that is hidden from view in FIG. 2, such as shown in FIG. 12B.

Returning to FIG. 2, a discharge gate valve 50 may be positioned below the lower section 76 of forming tank 40 in a discharge channel 96. As will be discussed below, in one embodiment, a valve 50 may be placed at an angle from the horizontal as shown in FIG. 2 using flanges 68 in the discharge channel 96. A static curved screen 60 may be disposed below the discharge gate valve 50, and the vibrating screen 70 may be positioned with and at least partially below the curved screen 60. A basin 65 may be positioned below the curved screen 60 to capture water that may be separated from the prills as they travel down the curved screen 60.

Figure 3:
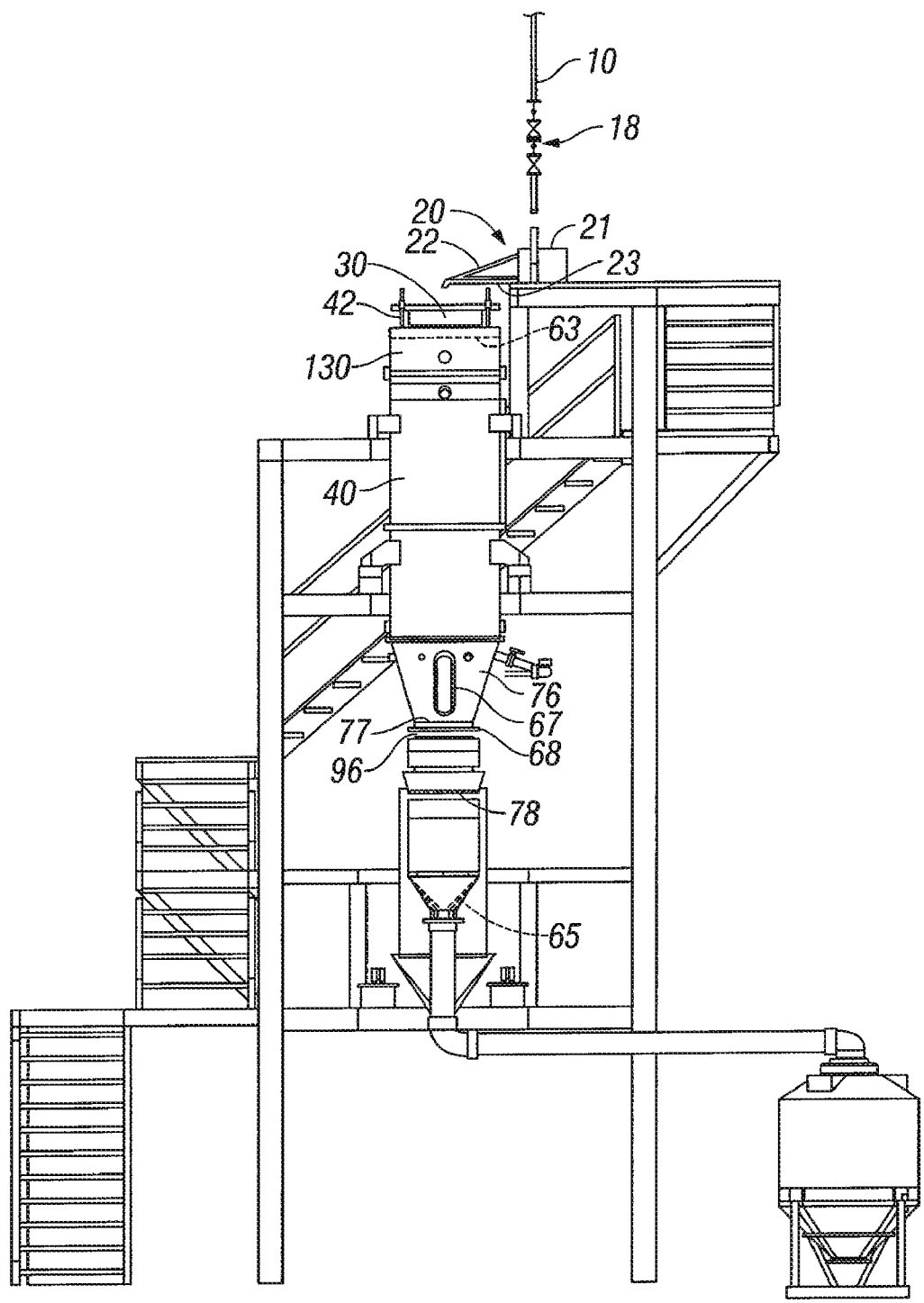
FIG. 3 is a front elevational view of a nested strainer positioned over a prill tray mounted over a forming tank, with an overflow container at the top of the tank.

In FIG. 3, a conduit 10 passes through an actuated valve 18. One end of the conduit 10 may be positioned with the nested container 20. Liquid or molten sulfur may enter the top of a strainer housing 21 and exit through a conduit 23, with a conduit 22 being used for overflow. The drip tray 30 may be mounted with leveling fasteners such as threaded rods 42 over the forming tank 40. The overflow container 130 may be attached to the forming tank 40 and extend above its top 63. A sight window 67 may be in the lower section 76 above bottom 77 of the forming tank 40. Flanges 68 allow a discharge channel 96 from the forming tank 40 to be curved until an opening 78. The basin 65 may be positioned to capture water from the curved screen 60.

Figure 4A:
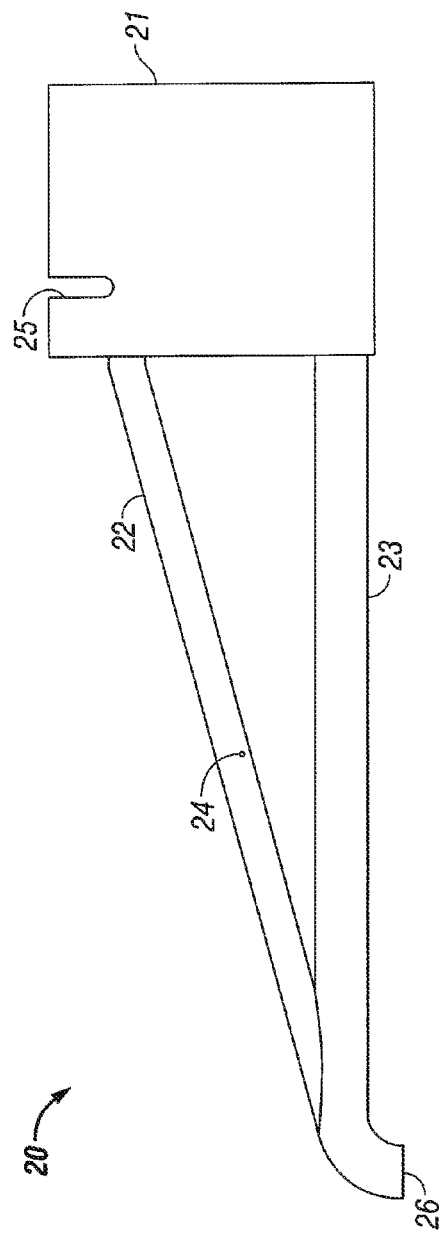
FIG. 4A is an elevational view of a strainer housing with the internal filters removed, and conduits attached to the housing.
Figure 4B:
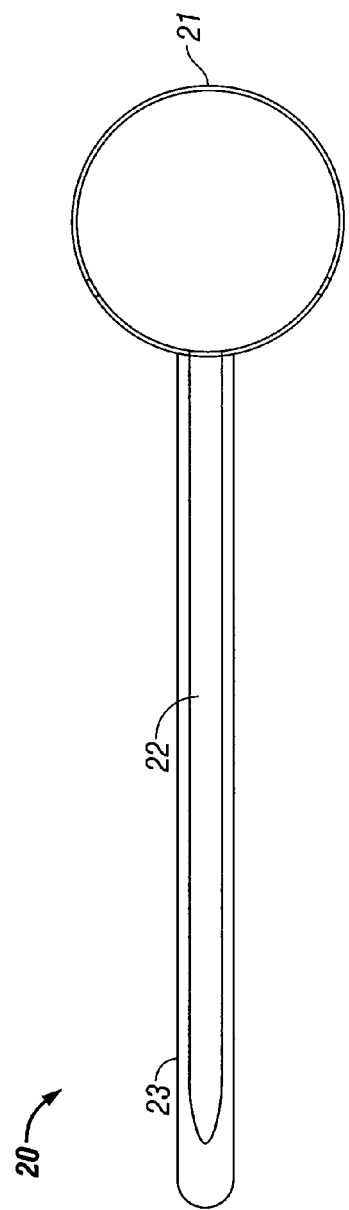
FIG. 4B is a plan view of the strainer housing and conduits of FIG. 4A.

FIGS. 4A and 4B show an exemplary strainer housing 21 and conduits (22, 23) of the novel nested strainer 20. A notch 25 in the strainer housing 21 may be used for positioning an arm 27 of a large basket filter 28, as will be described below in conjunction with FIGS. 5C and 5D. Although only one notch 25 is shown in FIG. 4A, there may be more than one notch 25 to mate with more than one arm 27. In one embodiment, there may be three notches 25 positioned an equal distance around the circumference of the strainer housing 21 as it is viewed in FIG. 4B. The notch 25 may be $13/16$ inches (2.06 cm) wide and $2 3/8$ inches (6.03 cm) long. It is noted that the sizes and dimensions provided herein are for a smaller prilling system. Other systems may utilize different sizes and dimensions for the various components without departing from the spirit of the present invention. The strained or filtered molten sulfur will exit at a nozzle 26. The housing and nested filters are heated and remain heated during operation. The housing and nested filters are heated by steam, although other methods may be used. The conduit 22 is generally for overflow. The conduit 23 may be $1 1/2$ inch (3.81 cm) diameter pipe, and the conduit 22 may be 1 inch (2.54 cm) diameter pipe. The strainer housing 21 may be a cylindrical shape with a 10 inch (25.4 cm) diameter and a 12 inch (30.5 cm) height.

All components of the nested strainer 20 are generally stainless steel, although other corrosive-resistant and compatible materials, known in the art, but novel when used herein, may be used. A sensor 24 may be positioned along the interior of the conduit 22, near the midpoint of its length. The sensor 24 detects flow, although other characteristics such as temperature, pressure, and/or other information may be detected. The sensor 24 may be mechanical, electrical, hydraulic, pneumatic, or some other means as is known in the art, but novel when used in connection with the invention. Information from the sensor 24 may be received by a CPU (not shown), and that an actuated valve 18 may be controlled remotely by such CPU. The actuated valve 18 may be mechanical, electrical, hydraulic, pneumatic, or some other means as is known in the art, but novel when used in connection with the invention. The conduit 10 may be closed at the valve 18 should flow be detected by the sensor 24 or diverted to alternate strainer/filter(s).

Figure 5E:
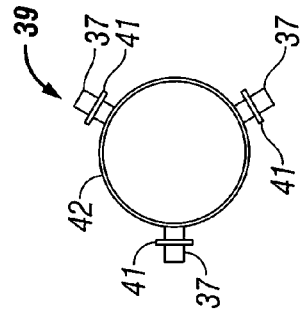
FIG. 5E is an elevational view of a small basket filter.
Figure 5F:
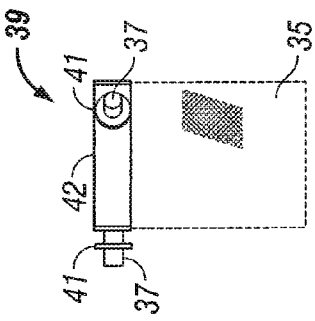
FIG. 5F is a plan view of the filter of FIG. 5E.
Figure 5C:
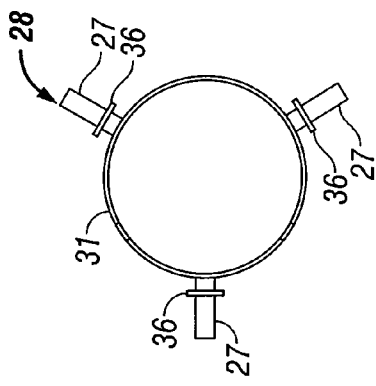
FIG. 5C is an elevational view of a large basket filter.
Figure 5D:
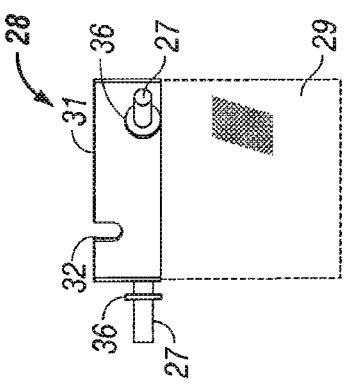
FIG. 5D is a plan view of the filter of FIG. 5C.
Figure 5A:
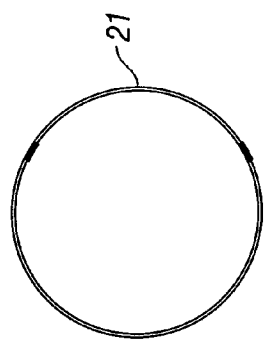
FIG. 5A is an elevational view of a strainer housing.
Figure 5B:
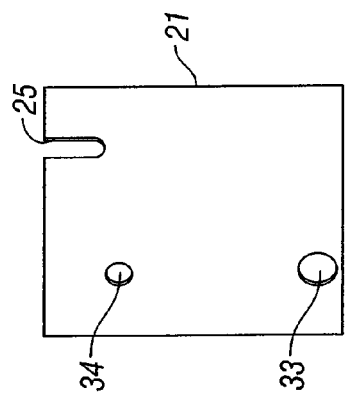
FIG. 5B is a plan view of the strainer housing of FIG. 5A.

Turning to FIG. 5A, ports (33, 34) in the housing 21 provide a path between the interior of the housing 21 with the conduits (23, 22). The port 33 may be $1 1/2$ inch (3.81 cm) diameter to match the conduit 23, and the port 34 may be 1 inch (2.54 cm) diameter to match the conduit 22. The center of the port 33 may be positioned 1 inch (2.54 cm) above the bottom of the housing 21, and the center of the port 34 may be positioned 9 inches (22.86 cm) above the bottom of housing 21.

Turning to FIGS. 5C and 5D, a large basket or internal filter 28 comprises a top ring 31, arms 27, and a mesh basket 29. The mesh 29 may be attached to a top ring 31. The mesh 29 and the top ring 31 are generally a combined height of 10 inches (25.4 cm). They have a diameter of 8 inches (20.32 cm). The top ring 31 is generally $2 3/4$ inches (7 cm) in height. The mesh 29 generally contains smaller openings than mesh 35, which is shown in FIG. 5E. Openings in the mesh 29 may be smaller than the diameter of holes 53 in the drip tray 30, as will be described in conjunction with FIG. 7D. The nested strainer 20 may trap Carsul, particles, and other impurities that would be large enough to partially or completely plug holes 53 in the drip tray 30. Returning to FIG. 5C, the arms 27 are attached to the top ring 31 generally 2 inches (5.08 cm) below the top of ring 31. The arm 27 is generally cylindrical in shape, with a length of 2½ inches (6.35 cm) extending from the exterior surface of the top ring 31, and a washer positioned 1¾ inches (4.45 cm) from the free end of the arm 27. The arms 27 may be positioned at an equal distance away from each other along the circumference of the top ring 31 as viewed in FIG. 5D.

The notch 32 in the top ring is generally 13/16 inches (2.06 cm) wide and 1⅛ inches (2.86 cm) long. There may be three notches 32 in the top ring 31 spaced at an equal distance away from each other along the circumference of the top ring 31 as viewed in FIG. 5D. The fully assembled nested strainer 20, such as partially shown in FIG. 6, the arms 27 may rest in the notches 25, and arms 37, which are shown in FIGS. 5E and 5F, may rest in the notches 32.

Turning to FIGS. 5E and 5F, a small basket or internal filter 39 comprises a top ring 42, arms 37, and a mesh basket 35. The mesh basket 35 may be attached to the top ring 42. The mesh basket 35 and the top ring 42 are generally a combined height of 8½ inches (21.6 cm).

They generally have a diameter of 6 inches (15.24 cm). The top ring 42 is generally 1½ inches (3.81 cm) in height. The mesh basket 35 contains larger openings than the mesh basket 29, which is shown in FIG. 5C. As can now be understood, when the small filter 39 is positioned in the large filter 28, the mesh basket 35 will trap larger particles, and mesh basket 29 will then trap smaller particles that escape with the molten sulfur through the mesh basket 35. Returning to FIG. 5E, arms 37 are attached to the top ring 42 generally ¾ inches (1.91 cm) below the top of ring 42. The arm 37 is generally cylindrical in shape, with a length of 1½ inches (3.81 cm) extending from the exterior surface of the top ring 42, and a washer positioned ¾ inches (1.91 cm) from the free end of the arm 37. The arms 37 may be positioned at an equal distance away from each other along the circumference of the top ring 42 as viewed in FIG. 5F.

Figure 6:
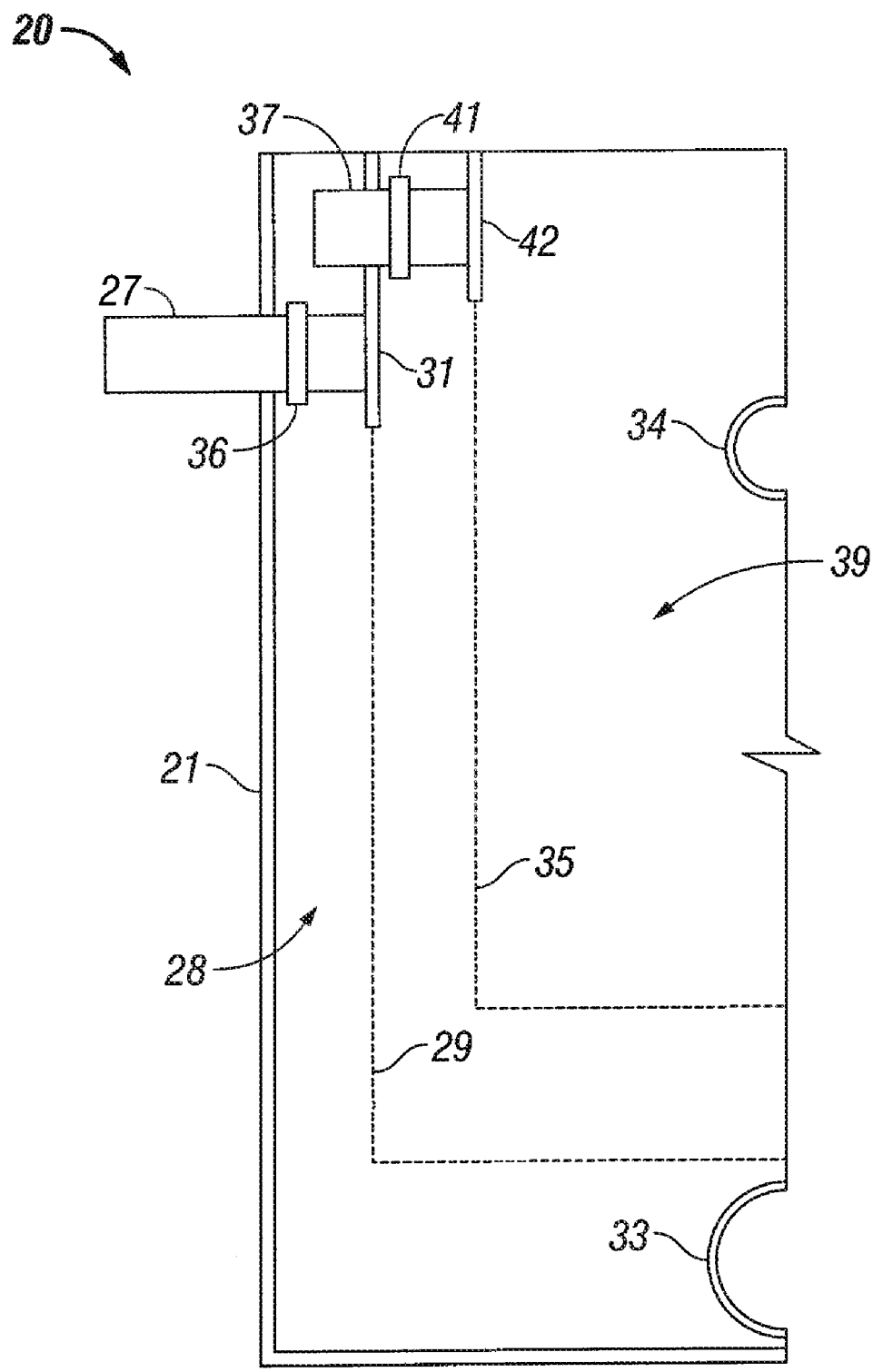
FIG. 6 is an elevational section view showing one half of a small basket filter positioned inside one half of a large basket filter, both of which are disposed inside one half of a strainer housing.

As shown in FIG. 6, the small basket filter 39 may be positioned in the large basket filter 28, which may both be positioned in the strainer housing 21. The liquid or molten liquid sulfur that contains impurities and particles, such as Carsul, may enter the top of the nested strainer 20. When the filters (28, 39) become clogged with such impurities, then the liquid or molten sulfur will begin to flow out the port 34 and through the conduit 22 and be detected by the sensor 24, which may signal the CPU to shut off the flow, or divert the flow to another strainer/filter(s). The filters (28, 39) may be easily removed and cleaned. Multiple identical filters (28, 39) may be available so that when one set may become clogged, replacements may be used to continue operations while the others are being cleaned. There may be more or less than two filters (28, 39) in the strainer 20. A system of more than one nested strainers 20 may be placed in series or parallel, each nested strainer 20 containing more or less than two internal filters (28, 39). The primary advantage of the nested strainer 20 is in its removal of impurities such as Carsul from the liquid sulfur before it plugs or obstructs holes 53 in the drip tray 30, as will be discussed below in conjunction with FIG. 7A. The filters (28, 39) are much easier to clean, and not nearly as expensive to replace, as drip tray 30. When the nested strainers 20 are placed in parallel, system operation may continue when replacing one set of nested strainers 20.

Turning to FIGS. 7A through 7D, a channel 52 may be attached to the underside 101 of the drip tray 30. The channel 52 may be a half pipe welded to the underside 101 of the tray 30. However, other types and sizes of the channel 52, as well as attachment means as known in the art, but novel when used in the present invention, can be used. A conduit 51 may connect with the channel 52. When the liquid or molten sulfur is poured into the drip tray 30, it must be kept sufficiently hot to maintain the proper viscosity so as to allow the sulfur to effectively flow though the drip tray 30 during the normal operation process. Steam may run through the conduit 51 and the channel 52 to uniformly heat the drip tray 30 through thermal conduction or other heat transfer mechanisms. In addition, other fluids or gases as known in the art, but novel when used herein, may be used to heat the drip tray 30. Although one channel 52 in the system is shown, there may be more than one channel 52, and that the separate channels may not be coupled with each other. The conduit 52 may be 1 inch (2.54 cm) diameter Schedule 40 stainless steel pipe, and that the channel 52 may be such same pipe cut in half along its length. The snake like pattern of channel 52 insures that tray 30 will be heated uniformly and remained heated during operation. However, other patterns can be used so that the drip tray 30 remains heated.

Figure 7C:
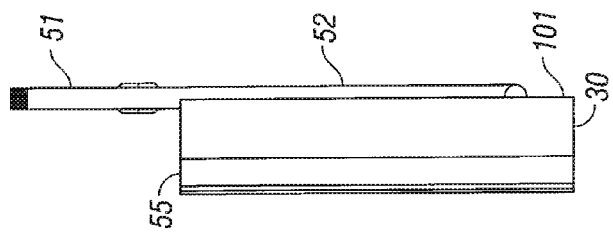
FIG. 7C is a right side elevational view of the drip tray and channel of FIG. 7A.
Figure 7A:
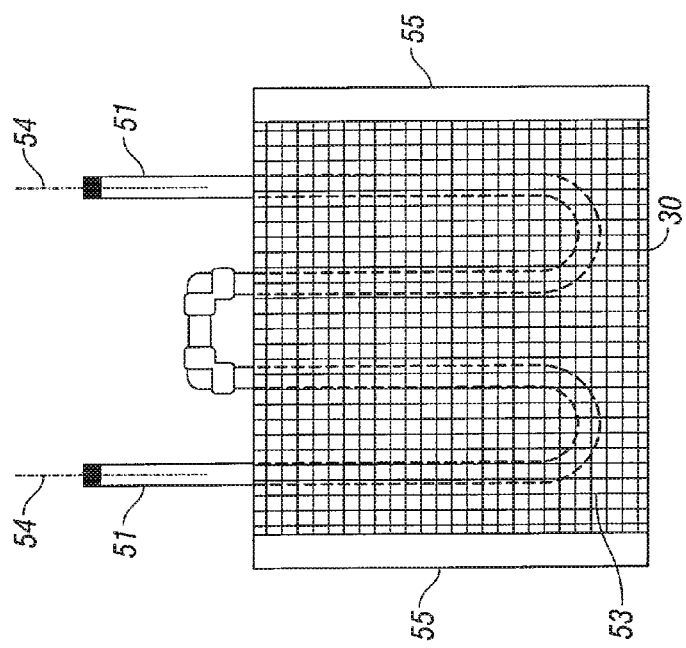
FIG. 7A is a plan view of a drip tray with a channel shown in phantom attached underneath.
Figure 7D:
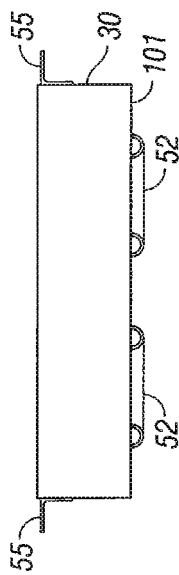
FIG. 7D is a front elevational view of the drip tray and channel of FIG. 7A.
Figure 7B:
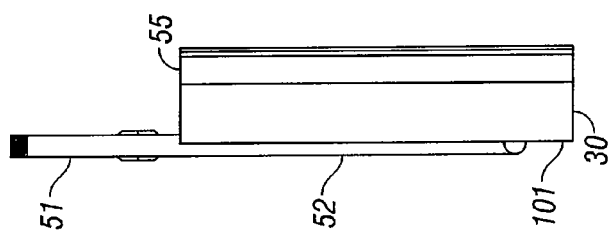
FIG. 7B is a left side elevational view of the drip tray and channel of FIG. 7A.

In one embodiment, the drip tray 30 may be approximately square in plan view as seen in FIG. 7A. In one embodiment, its width would be 2'-2¼" (66.68 cm) and its length 2'-1¼" (64.14 cm). In one embodiment, longitudinal centerline 54 of the conduit 51 is 3⅞ inches (9.84 cm) from the side of the drip tray 30 as viewed in plan in FIG. 7A. The longitudinal centerlines 54 of straight sections of the channel 52 under the drip tray 30 as shown in FIG. 7A are generally spaced 6¼ inches (15.88 cm) apart. The depth or height of tray 30 may be 6 inches (15.24 cm). The location of the channel 52 underneath the drip tray 30 has the advantage of allowing the steam or other gas or fluid to be in direct contact with the underside of the drip tray 30, which makes the heating more efficient. This arrangement allows the entire drip tray 30 to heat up and expand homogeneously, eliminating separation and expansion cracks. Further, in the event there is a leak that develops in the channel 52 or its welds, steam condensate would simply drip into the forming tank 40 below, and allow operations to continue until the next scheduled shut down.

In one embodiment the drip tray 30 contains 521 uniform sized holes 53 through which liquid or molten sulfur may pass and form into droplets. However, a single drip tray 30 may contain 5000 or more holes 53. There may be more than one drip tray 30 used at a time, so as to provide 5000 or more holes 53. The holes 53 are circular and generally 3/32 inch (0.24 cm) in diameter. The holes 53 are generally located on a one square inch (2.54 cm) grid. The holes 53 are generally no closer than 1½ inches (3.81 cm) from the longitudinal centerline 54 of the channel 52, which insures that droplets remain a sufficient distance from the channel 52.

Without the advantage provided by the nested strainer 20 of the removal of impurities from the liquid or molten sulfur, the holes 53 will generally become plugged or obstructed, which will necessitate an unscheduled shut down of operations. Whereas it is a labor intensive and time consuming process to remove one or more drip trays 30 and scrape out and clean hundreds or thousands of holes 53, it is much more efficient to change the filters (29, 35) of the nested strainer 20. The drip tray 30 may need to be cleaned two times a day while in operation if operated without the strainer 20. Moreover, when cleaning out or unclogging the relatively small and fragile holes 53 in the drip tray 30, it is likely that many of the holes 53 will become worn, particularly with multiple cleanings over time. This will lead to the holes 53 becoming enlarged and non-uniform in size, which will affect the geometry of the resultant prills and cause them to be non-uniform in size. Replacement costs for the drip tray 30 are much higher than for the filters (29, 35). The drip tray 30 may generally be made of stainless steel. However, other non-corrosive materials, as known in the art, but novel when used in the present invention, may be used. Angles 55 or other attachment members may be attached along the length of the drip tray 30 for use in attachment with forming tank 40.

Figure 8A:
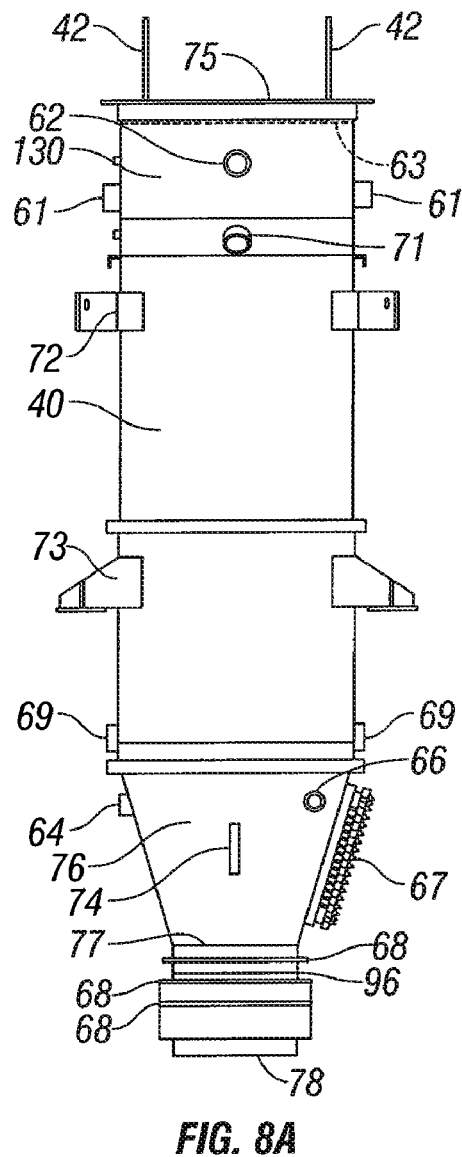
FIG. 8A is a front elevational view of a forming tank with an overflow container at the top.

Turning to FIG. 8A, the overflow container 130 may be attached near the top 63 of the forming tank 40. The top 75 of the overflow container 130 is above the top 63 of the forming tank 40. Four threaded rods 42 are attached to the top 75 of the overflow container 75. The drip tray 30 may be attached with threaded rods 42 using nuts or other level fastening means. The underside 101 of the drip tray 30 may generally be placed approximately 2 inches (5.08 cm) above the water surface in the forming tank 40. Tests have indicated that when the distance is approximately 2 inches, the produced prills generally meet the characteristics identified in Table 1 with a moisture content in the range of 1.8 percent to 2.2 percent. The water surface will be at top 63 of the forming tank 40. The threaded rods may be one inch (2.54 cm) diameter and 1'-1 ½" (34.3 cm) long. Since the top 63 of the forming tank 40 is below top 75 of an overflow container 130, when water reaches the top 63 it will spill into the overflow container 130.

Figure 8B:
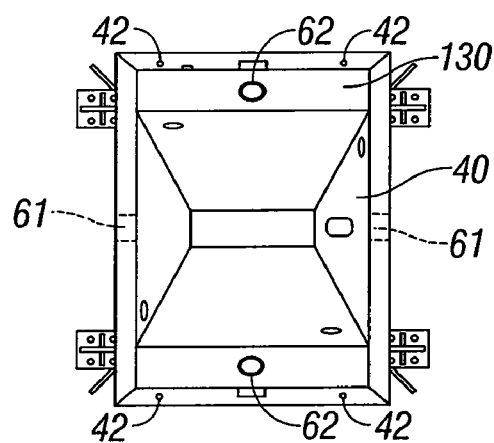
FIG. 8B is a plan view of the forming tank and overflow container of FIG. 8A.

Couplings 61 are attached to the forming tank 40 and said couplings 61 allow communication with the interior of the forming tank 40. The couplings 61 may be 3 inch (7.62 cm) diameter. In one embodiment, two conduits are used, such as the conduit 90 shown in FIGS. 1 and 2, and conduits 90 shown in FIG. 12B, may be attached with couplings 61 to transport cool water into the forming tank 40 through a conduit ring 94 or injection conduits 103, as will be discussed in conjunction with FIGS. 12A through 12D below. Couplings 62 may be attached to an overflow container 130 and allow communication with the interior of container 130. As shown in FIG. 8B, there may be two couplings 62. The two conduits (100, 120), as shown in FIGS. 1 and 2, may be attached with the couplings 62 to transport water that has spilled into the overflow container 130. The coupling 71 may be used for sensors or other measurement devices to measure temperature, flow, pressure, and/or other information.

The coupling 64 may be attached to the lower section 76 of the forming tank 40 and allow communication with the interior of the forming tank 40. The conduit 80 as shown in FIG. 1 may be attached with the coupling 64 to transport warm water to the forming tank 40, as will be discussed in detail below. The couplings (66, 69) may be used for overflow. The sight glass 67 may be positioned in the lower section 76. The height of the combined forming tank 40 and the overflow container 130 from the top 75 of container 130 to the bottom 77 of the tank 40 may generally be 12'-9⁷⁄₁₆" (3.9 m). The height of overflow container 130 may be 2'-1¼" (64.14 cm). Attachment members (72, 73) may be used to support the forming tank 40 on a frame as shown in FIG. 2.

Returning to FIG. 8A, flanges 68 may be used to change the direction of discharge the channel 96 after exiting the bottom 77 of the forming tank 40. The outlet 78 may generally be rectangular in shape. The opening in bottom 77 of the forming tank 40 may be rectangular in shape and similar in size to the outlet 78. The advantages of a generally funnel-shaped lower section 76 include that its shape minimizes the crushing effect that gravity and rubbing action may have on the prills, and also that it directs the prills toward the bottom 77. The advantages of transitioning to a rectangular opening in the bottom 77 of the forming tank 40 include that it eliminates a choke point or bottle neck for the prills that would otherwise occur with a circular opening, which would likely cause plugging of the circular opening with prills. It is generally costly and time consuming to unplug such an opening. Significantly, the rectangular shape allows the prills to be distributed uniformly later on the curved screen 60, as will be discussed below in detail.

The sensing device 74 may be positioned on the exterior of the forming tank 40 around the middle of the height of the lower section 76. In one embodiment, the sensing device 74 is a nuclear sensing device that may generate a wide beam from a radioactive material contained in a transmitter that may be radiated across the forming tank 40, and the change in intensity detected at the opposite side of the forming tank 40 by a tubular receiver (not shown). Because the beam will penetrate in a different way through the water than through the area where prill accumulation exists, the exact level of prills may be detected by the receiver. The information from the sensing device 74 may be transmitted to the CPU (not shown), which may signal the actuator 91 of the discharge gate 50 in order to control constant level of prills in the lower section 76 of the forming tank 40. Other sensing devices may be used as well. Such other sensing devices may be electrical, mechanical, hydraulic, pneumatic, or some other means.

Figure 9A:
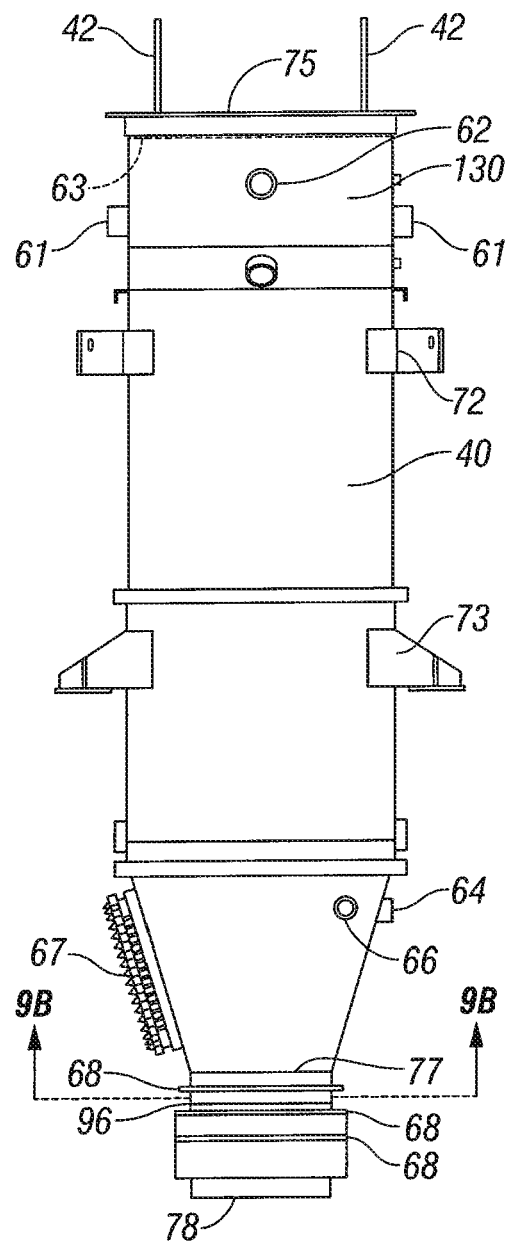
FIG. 9A is a back elevational view of the forming tank and overflow container of FIG. 8A.
Figure 9B:
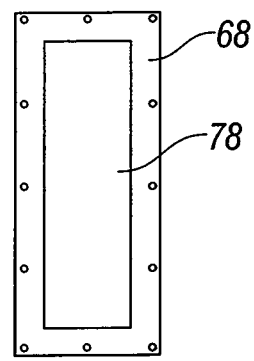
FIG. 9B is a section view taken along line 9-9 of FIG. 9A to better show the opening.

FIG. 9A is similar to FIG. 8A, but is viewed from a different direction. Turning to FIG. 9B, the outlet 78 is generally 5 inches (12.7 cm) by 20 inches (50.8 cm). The flange 68 may be 10 inches (25.4 cm) by 2'-0" (61 cm).

Figure 10:
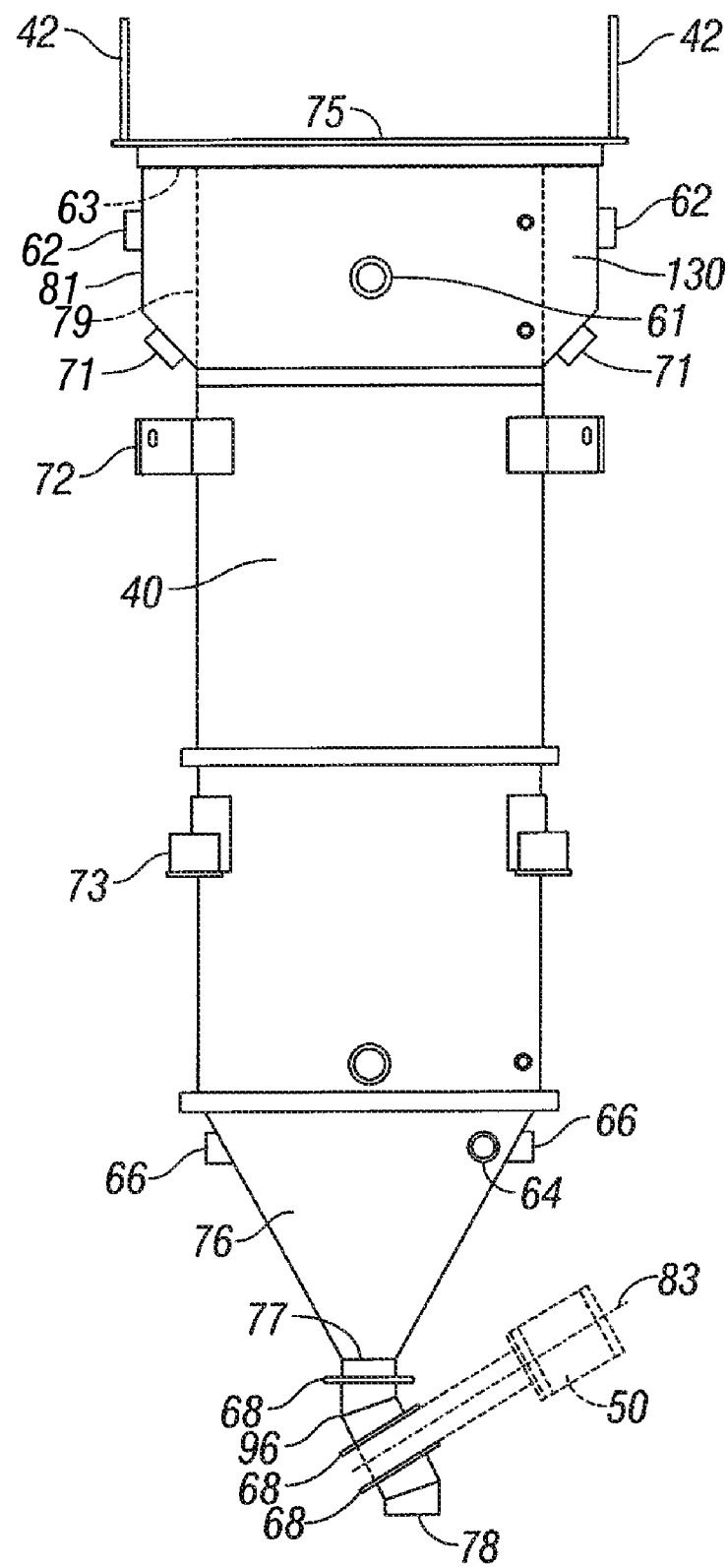
FIG. 10 is a left side elevational view of the forming tank and overflow container of FIG. 8A with a discharge gate valve in phantom attached below the bottom of the tank.

Turning to FIG. 10, the discharge gate valve 50 may be positioned below the bottom 77 of the forming tank 40 and above the outlet 78 along the discharge channel 96. As previously described, the discharge gate valve 50 may be remotely operated based upon information the processor receives from the sensor 74. The longitudinal axis 83 of the discharge gate valve 50 may generally be at a 60° angle from the horizontal axis to allow easy discharge of the prills. The discharge gate valve 50 is discussed below in conjunction with FIGS. 13A-13C.

Figure 11A:
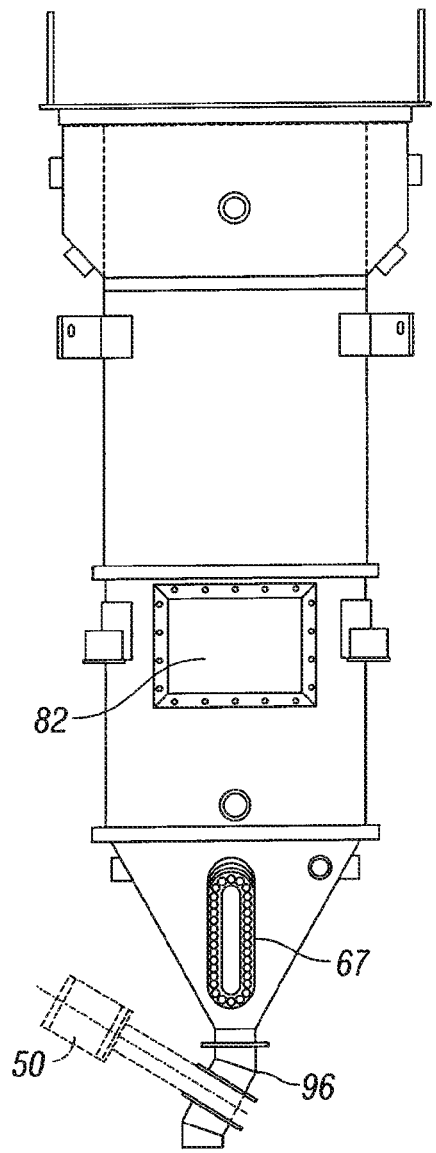
FIG. 11A is a right side elevational view of the forming tank and overflow container of FIG. 8A with a discharge gate valve in phantom positioned below the bottom of the tank.
Figure 11B:
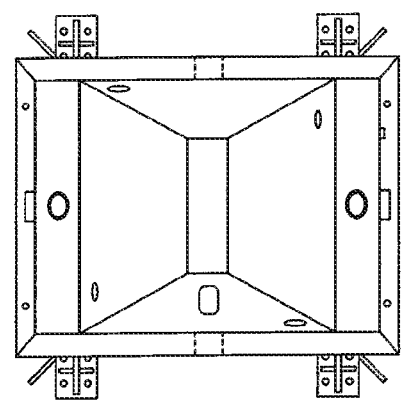
FIG. 11B is a plan view of the forming tank and overflow container of FIG. 11A.

Returning to FIG. 10, the distance between outside surface 81 of the overflow container 130 and an outside surface 79 of the forming tank 40 allows water that flows over the top 63 of the forming tank 40 to be captured in container 130. The trapped water may flow out of the couplings 62, which create ports in the container 130. FIG. 11A shows the forming tank 40 from a different direction. An access opening 82 may be covered with a metal plate when the access opening is not in use.

Figure 12A:
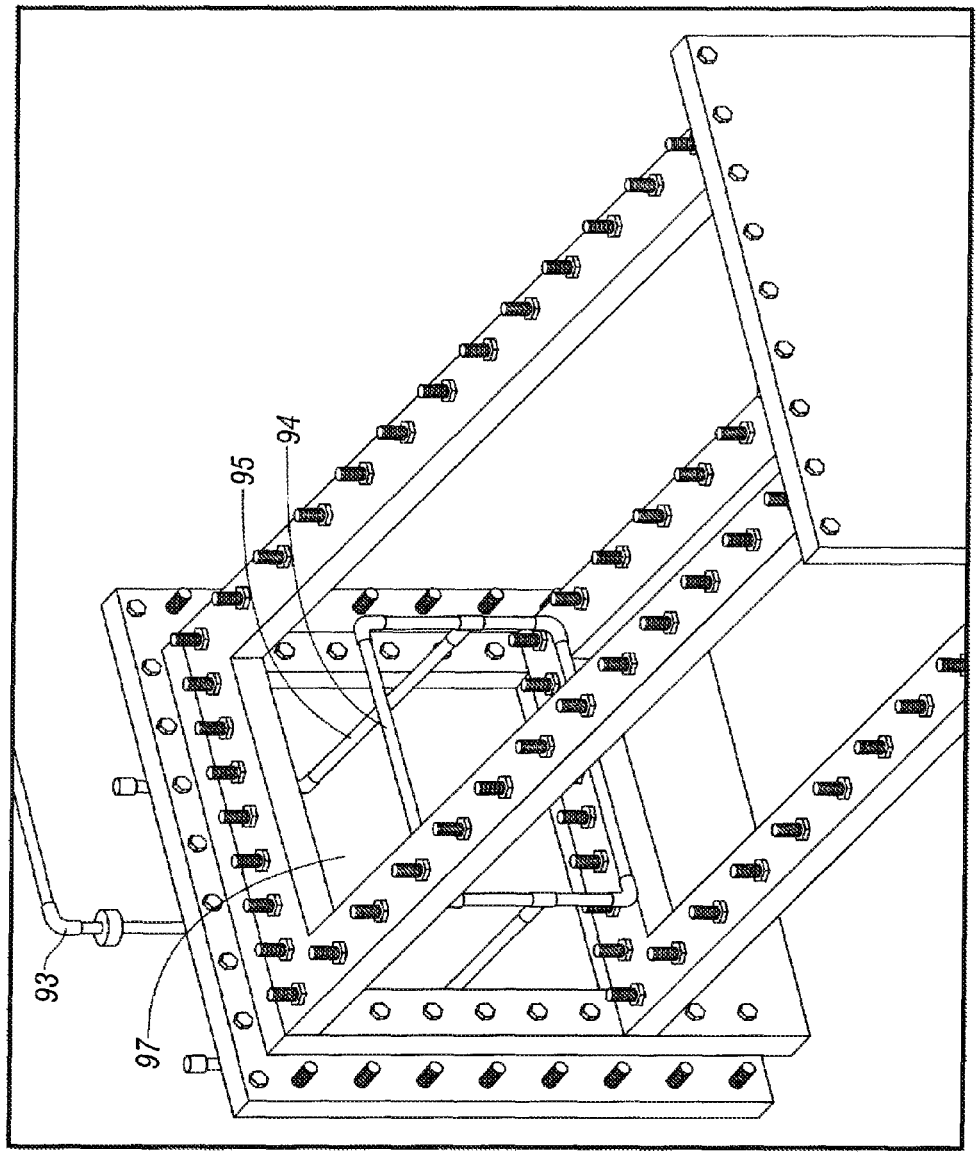
FIG. 12A is an isometric view of the top of a forming tank with two conduits entering the top of the tank and a conduit ring positioned inside.
Figure 12B:
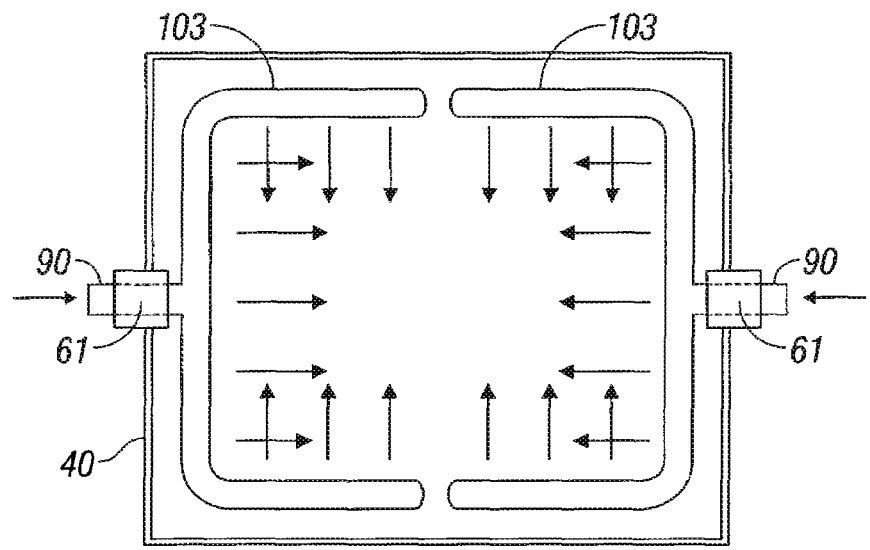
FIG. 12B is a section plan view taken through a forming tank of two injection conduits each in communication with a conduit extending outside of the tank.

Turning to FIG. 12A, in one embodiment the conduit 93 may be in communication with two conduits 95 (only one is shown) that may extend approximately 12 inches (30.5 cm) below the surface of the water into a tank 97. The conduits 95 may be connected with and in communication with a conduit ring 94. The conduit ring 94 may have ports or holes spaced along the inside of the ring 94 through which water may escape into the tank 97. The ring 94 may be made with approximately 1½ inch (3.81 cm) diameter conduit. The ports may generally be spaced 2 inches (5.08 cm) on center. The port size may be circular with diameter approximately ⅛ inch (0.32 cm). The ports may be angled downward at generally 30° from the horizontal centerline of ring 94. The conduit ring 94 may have different shapes or sizes. The conduit ring 94 may have ports located all around its body. As can now be understood, FIG. 12A shows one embodiment of how cold water may be delivered to the top of the forming tank 40 through the conduit 93 and out the conduit ring 94. The conduit ring 94 may be stainless steel. However, other corrosion-resistant and compatible materials, as known in the art such as CPVC, but novel when used herein, can be used. Rather than using the conduits 95 to enter the tank 97 through its top, that the conduits such as the conduit 90 in FIGS. 1 and 2 may transport water to the forming tank 40 through the couplings 61 shown in FIG. 8A. Once inside the forming tank 40, a conduit ring such as ring 94 in FIG. 12A may be used to disperse water into the forming tank 40.

Figure 12C:
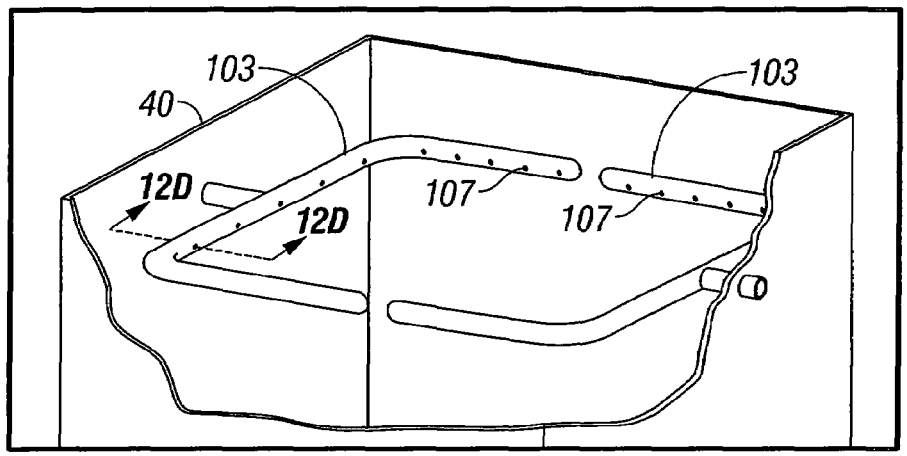
FIG. 12C is a cut away section isometric view through a forming tank of one complete injection conduit and another partial injection conduit, both containing several ports.
Figure 12D:
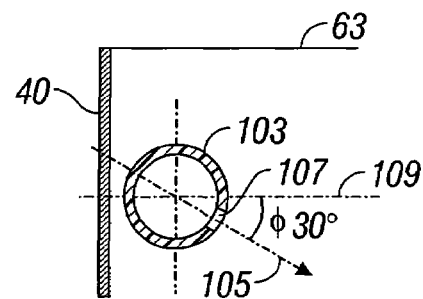
FIG. 12D is a section view taken along line 2-2 of FIG. 12C to better show a port in an injection conduit.

Turning to FIGS. 12B through 12D, an injection embodiment for the delivery of cool water to forming tank 40 is shown. Each of two conduits 90 may be in communication with a different injection conduit 103 as shown in FIG. 12B. Each of the conduits 90 may attach with the injection conduit 103 at a coupling 61. As previously described, the couplings 61 may generally be located approximately 12 inches (30.5 cm) below top 63 of forming tank 40. The injection conduit 103 may be made with approximately 1½ inch (3.81 cm) diameter conduit. As shown in FIG. 12C, the injection conduit 103 may have ports, orifices or holes spaced along the inside of the injection conduit 103 through which water may escape toward the interior of the forming tank 40. The ports 107 may generally be spaced 2 inches (5.08 cm) on center. The port 107 size may be circular with diameter approximately ⅛ inch (0.32 cm). As shown in FIG. 12D, a centerline 105 of the ports 107 may be located at angle θ from a horizontal centerline 109 of the injection conduit 103. The angle θ may generally be 30°. The injection conduit 103 may have different shapes or sizes, such as being "U" or "Y" shaped as seen in plan view. The injection conduit 103 may have ports 107 located all around its body. There may be one or more injection conduits 103. The injection conduit 103 may be stainless steel. However, other non-corrosive materials as known in the art, but novel when used in the present invention, may be used. The injection conduits 103 may transport water to the forming tank 40. As can now be understood, the embodiments described above in conjunction with FIGS. 12A to 12D show how a relatively cold zone of water may be established in an area of the forming tank 40 where prills are initially formed.

Turning to FIGS. 13A, 13B and 13C, a pneumatic actuator 91 of the discharge gate valve 50 activates the valve 50 to open and/or close the discharge channel 96 to the outlet 78 based upon the information the actuator 91 receives from the CPU, which is in communication with the sensor 74. The rectangular opening 78 may act as a spreader bar that will allow the prills to slide onto the static curved screen 60 in a uniform manner.

Figure 14:
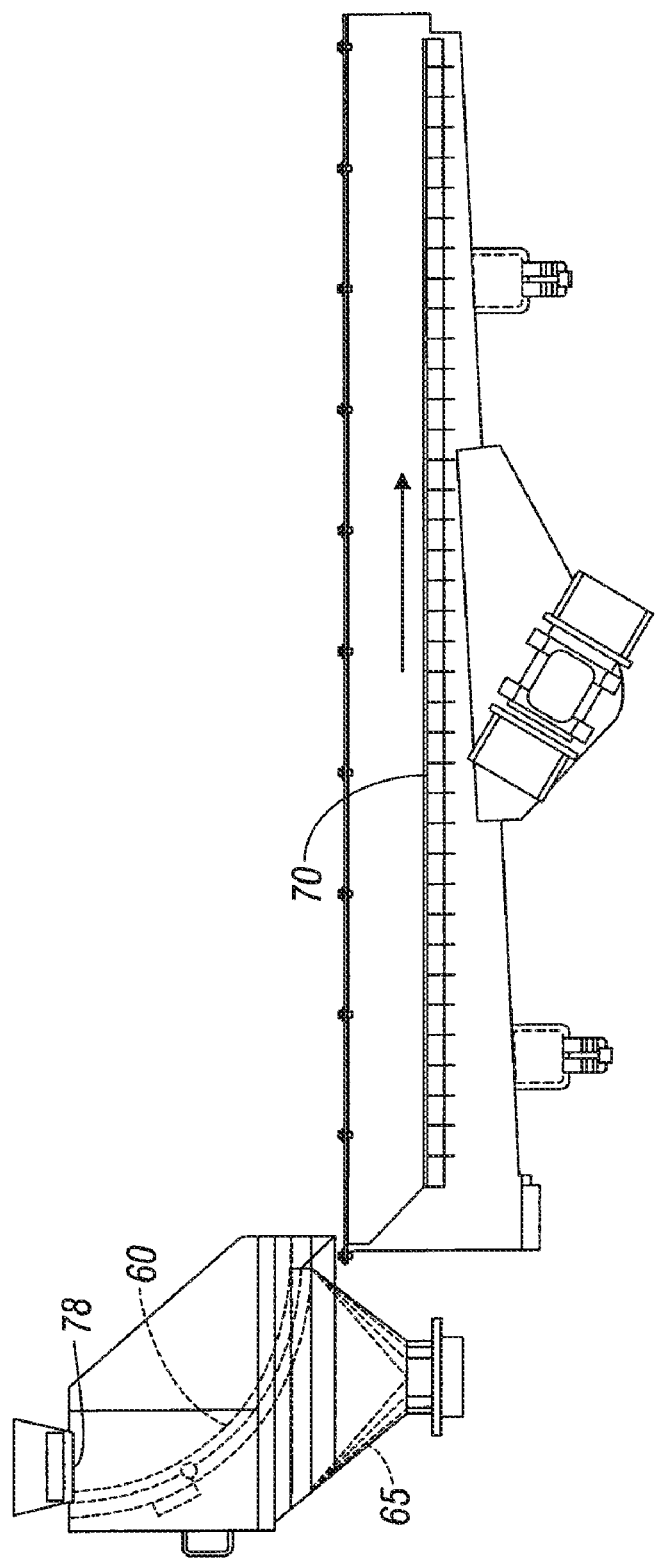
FIG. 14 is an elevational view of a curved screen over a basin, both shown in phantom, which curved screen is positioned with a vibrating screen, which is shown partially in phantom.

As shown in FIG. 14, the curved screen 60 is stationary and may generally be positioned below the outlet 78. A basin 65 may be positioned below the screen 60. The prills will be generally uniformly distributed along the screen 60 due to the rectangular size of the outlet 78. The prills may slide down the screen 60 after exiting the outlet 78. The sliding action will remove water exiting with the prills. Most of the water will be removed from the prills by the curved screen 60. This sliding action will gently guide the prills onto the vibrating screen 70. Most of the water will be removed by the screen 60, and that a vibrating screen 70 may be relatively short, thereby minimizing unwanted mechanical abrasion of the prills which may occur with mechanical vibration. The vibrating screen 70 also allows transportation of the prills to a storage or transportation area. The wedge wire of the screen 70 may be positioned parallel to the direction of flow of the prills, as shown by arrow on FIG. 14, so as to reduce the filing action on the prills. The slotted free opening on the vibrating screen 70 may be 0.02 inches (0.05 cm), which should reduce the amount of fines going through screen 70.

Figure 15:
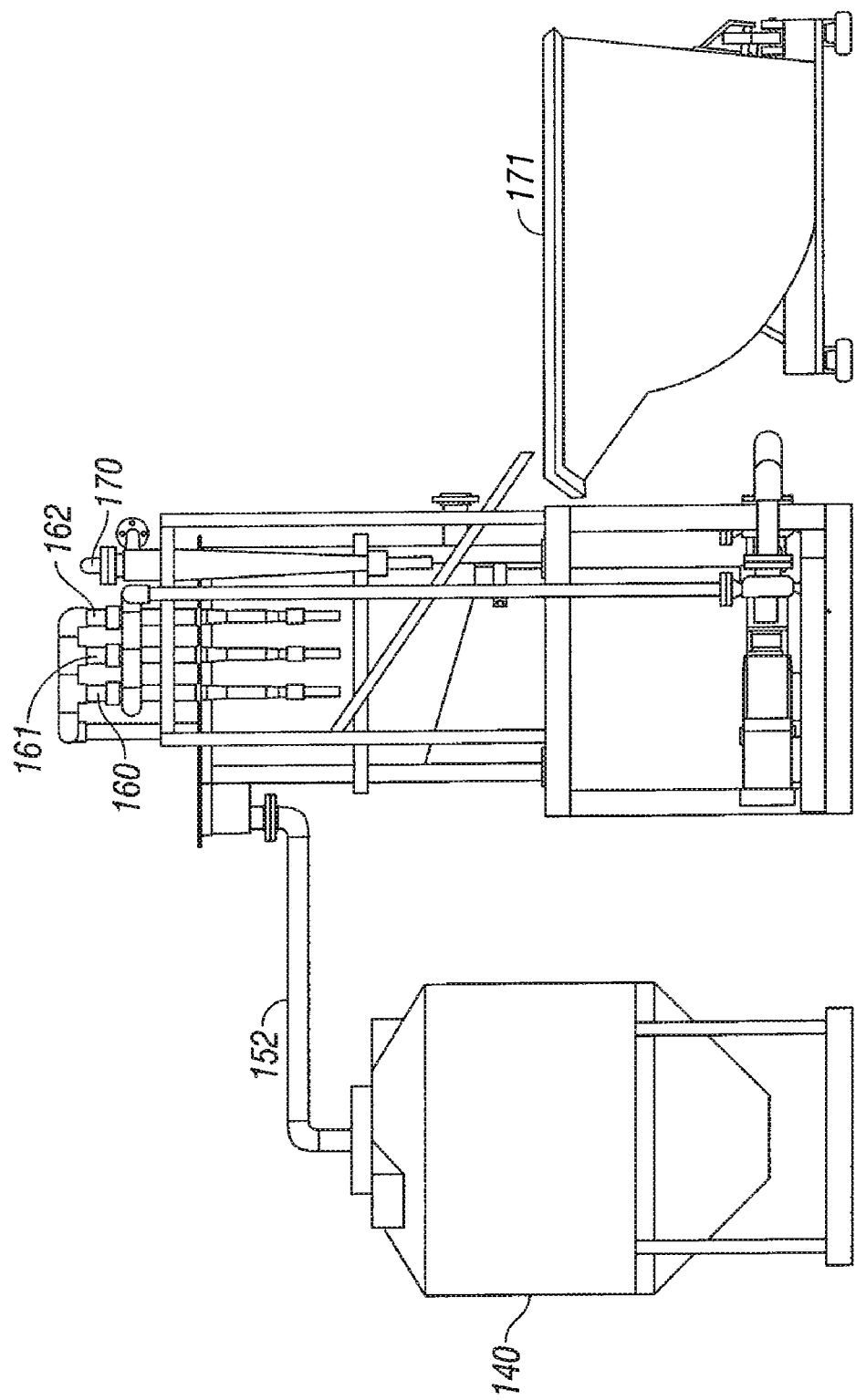
FIG. 15 is an elevational view of a tank with a conical lower section in communication with four hydro-cyclones in series, and a container.

Turning to FIG. 15, the tank 140, also shown in FIG. 1, may be in communication through a conduit 152 with four hydro-cyclones (160, 161, 162, 170), that are aligned in series. One embodiment may contain four hydro-cyclones (160, 161, 162, 170) in series. The exemplary embodiment may allow for bypassing one or more of the hydro-cyclones. There may be one or more hydro-cyclones. The tank 140 has a conical lower section that has the advantage of preventing fines from settling out of the water. Flat bottom tanks quickly fill up with fines, which would require such a system to be taken out of service for an extended period of time at substantial expense. Impurities such as fines may be removed by the hydro-cyclones (160, 161, 162, 170) and transported to a hopper or tank 171. Cleaned water may be discharged into and accumulated in the tank 180 as shown in FIG. 1. The cleaned water may leave the tank 180 through conduits (182, 184). The tank 180 also has a conical lower section.

The filtration system shown in FIG. 15 may be a multiple stage design where the water initially goes through one or more hydro-cyclones depending on the volume of water to remove sulfur fines up to a certain micron size. The overflow from the larger hydro-cyclone may subsequently be cycled through a series of smaller diameter hydro-cyclones to take out the ultra fine material before the filtered water is pumped to the cooling tower 192 through the conduit 184 and re-injected through the conduit 80 in the forming tank 40. A smaller portion of the filtered water may be diverted through the conduit 182 to a chiller package 190 where it is cooled to the required temperature and re-injected through the conduit 90 near the top of the forming tank 40. As can now be appreciated, the recirculation system is a closed system.

Method of Use

Liquid or molten sulfur may be converted to solid uniform sized prills using the process shown in FIG. 1. While the discharge gate 50 may be closed, relatively warm water in the range of 95° F. to 105° F. may be injected through the conduit 80 into the forming tank 40. Relatively cold water no warmer than 80% for sulfur prill production, and generally in the range of 55° F. to 60° F. may be injected through two conduits such as the conduit 90 into the upper portion of the forming tank 40 approximately 12 inches (30.5 cm) below the top 63. Injection conduits 103 as shown in FIG. 12B may be used to deliver the cold water into the interior of the forming tank 40. The forming tank 40 may be completely filled with water. More water may enter through the conduit 80 than through the conduit 90, which may cause an upward draft of water from the bottom to the top of the forming tank 40. An average temperature in the range of 75° F. to 80° F. may be established and maintained in the prill forming zone located approximately 12 inches (30.5 cm) below the top 63. This method has the advantage of cooling the upper zone of water where the prills are first formed, without the excessive expense of cooling all of the water in the forming tank 40 to the desired temperature range. Overflow water may be trapped by an overflow container 130 and transported away by conduits (100, 120).

Liquid or molten sulfur may enter the system through the conduit 10. It is transported to the top of the nested strainer 20, through which it travels through filters (29, 35) and generally out the conduit 23 as shown on FIG. 4A. The nested strainer 20 is heated and remains heated during operation to allow the flow of the molten sulfur. If the liquid or molten sulfur travels through the conduit 22, then the sensor 24 may detect the flow and notify the CPU processor, which may terminate the flow of sulfur through the actuated valve 18 or divert to another strainer/filter(s). In such circumstance, the filters (29, 35) may be replaced and/or cleaned. The liquid or molten sulfur exits the strainer 20 at the nozzle 26 and then enters the drip tray 30, which may be heated by steam flowing through the conduit 51 and the channel 52, as shown in FIG. 7A. Droplets are formed through the gravity flow of liquid or molten sulfur through the holes 53. The drip tray 30 may be positioned so that the droplets fall approximately 2 inches (5.08 cm) to the top surface of the water at the top 63 of the forming tank 40. However, other distances may be used to change the size of the prills.

When the droplets enter the prill forming zone of the water near the injection conduits 103, the liquid or molten sulfur stream breaks down and forms spherical prills by quenching the sulfur in relatively colder water. The lower water temperature solidifies the outer surface of the sulfur particle, while the sulfur core is still in a semi-plastic state. Interfacial forces are created at the interface between the solid and liquid phase, which pulls the particle into a spherical shape and prevents it from solidifying into an irregular shape. The quick solidification of the surface typically prevents the prills from sticking together as they descend to the bottom of the forming tank 40. Once the prills are formed in the forming zone, they travel down by gravity and continue to exchange heat with the upcoming hotter water. This assures further solidifying and cooling of the prill core, but in a gentle way. The solidified prills spill out of the bottom of the forming tank 40 at a temperature of generally 105° F. to 115° F. but other temperature ranges are contemplated.

Generally, while the first prills are being formed, the discharge gate 50 may be closed. When a sufficient number of prills fill the lower section 76 of the forming tank 40, such as for example approximately one-half, the sensor 74 may send a signal to the CPU, which may partially opens the discharge gate 50 so that prills may flow through the opening 78 to the curved screen 60. Also, the LIT1 sensor provides the CPU with information pertaining to the height of the water level in the forming tank 40. In one embodiment, the distance between the lower portion of the drip tray 30 and the water in the forming tank 40 is approximately 2" (5.08 cm). The discharge gate 50 also opens and closes to maintain a certain level of the sulfur prills in the forming tank 40. The discharge gate 50 includes an actuator (not shown) coupled to the CPU for opening and closing the gate when instructed by the CPU. Thus, the discharge gate 50 may open/close to maintain the amount of sulfur prills in the lower section 76 of the forming tank 40.

As the discharge gate 50 opens and closes to maintain the desired sulfur prill level in the lower section 76 of the forming tank 40, more or less sulfur prills and water (discharge water) will exit the lower section 76 of the forming tank 40. This loss of water will drop the water level in the forming tank 40 and increase the distance between the drip tray 30 and the overflow water level in the forming tank 40. The sensor LIT1 will communicate with the CPU to accelerate a variable speed pump to inject additional water through the conduit 80 to compensate for the loss water and maintain the desired distance between the drip tray 30 and the water level in the forming tank 40.

The prills will be uniformly disbursed on the curved screen 60 due to the rectangular opening 78 at the end of the discharge channel 96. The gate 50 may only partially open so as to allow the warmer water injected at the bottom of the forming tank 40 to continue to circulate toward the top of the forming tank 40 which aids in the formation of the sulfur prills. As the prills slide down the curved screen 60, the sliding action will remove the majority of the water from the prills, which will be captured in the basin 65. The prills will exit the curved screen 60 and enter the vibrating screen 70, where they will have excess fines removed and dewater by means of mechanical agitation and evaporation to an acceptable moisture range.

As shown in FIG. 1, the water captured from the overflow container 130 and the screens (60, 70) may be transported through the hydro-cyclones (160, 161, 162, 170) for removal of the fines. A smaller amount of the cleaned water may be cooled in a chiller package or refrigeration system 190, and a larger amount of the cleaned water may be cooled in a cooling tower 192. The water may be re-circulated back to the forming tank 40 in a closed system, with the warmer water entering through the conduit 80, and the cooler water entering through two conduits such as the conduit 90. As can now be appreciated, the tanks (140, 180) are not connected, so there is no possibility of cross contamination. Level detection devices in the tanks (140, 180) signal information on the levels to the CPU, which controls a series of diverting valves and variable speed pumps to maintain appropriate levels in all tanks at all times. The pumps feeding the filtration system have fixed flow rates, which supply the devices with a constant pressure for maximum separation. The size of the prills may be changed by adjusting the height of the drip tray 30 from the top 63 of the forming tank 40. The size of the prills may be changed by using different water temperatures in the forming tank 40. The size of the prills may also be changed by using different hole 53 sizes or shapes in the drip tray 30.

Sulfur prills produced from this method generally have the characteristics identified in Table 1 and minimum moisture content. The prills are generally spherical in shape, with minimal sharp edges, and have a very narrow size distribution. Another advantage of the system is scalability of sulfur prill output. The size of the forming tank and the drip tray generally determine the production rate of the sulfur prills. Thus a smaller forming tank and a drip tray may be used for smaller production prill rates and vice versa for larger production prill rates.

The foregoing disclosure and description of the invention are illustrative and explanatory thereof, and various changes in the details of the illustrated apparatus and system, and the construction and the method of operation may be made without departing from the spirit of the invention.

What is claimed is:

1. A system for converting molten sulfur to sulfur prills, comprising:
   a heated removable strainer for removing non-sulfur particles from the molten sulfur;
   the removable strainer coupled to a drip tray;
   a first conduit attached to the drip tray for heating the drip tray;
   the molten sulfur traversing to the drip tray forming sulfur droplets;
   a tank storing a liquid media, said liquid media comprising a first media and a second media;
   a second conduit inside the tank for delivering the first media to a first area of the tank;
   a third conduit for delivering the second media to a second area of the tank;
   the sulfur droplets traversing a distance from the drip tray to the liquid media in the tank; and
   relatively spherical shaped sulfur prills formed by the interaction of the sulfur droplets with the media.

2. The system of claim 1, wherein the second conduit having a plurality of ports.

3. The system of claim 2, wherein the second conduit comprising a ring.

4. The system of claim 3, wherein the ports spaced along the inside of the ring.

5. The system of claim 2, wherein the second conduit comprising a U-shape.

6. The system of claim 5, wherein the ports spaced along the inside of the U-shape.

7. The system of claim 2, wherein the second conduit comprising a Y-shape.

8. The system of claim 7, wherein the ports spaced along the inside of the Y-shape.

9. The system of claim 1, wherein the liquid media, the first media and the second media are water.

10. The system of claim 9, wherein the first media is relatively cooler than the second media.

11. The system of claim 1, wherein the removable strainer is heated by steam.

12. The system of claim 1, wherein the removable strainer having an overflow conduit.

13. A forming tank for manufacturing sulfur prills, comprising:
- a tank having a top section and a bottom section; said top section having a cross sectional circular shape and said bottom section having walls converging with respect to one another to at least partially define a funnel shape;
- a first conduit inside the tank for injecting a first liquid media into the top section of the tank, said first liquid media creating a sulfur prilling formation zone in the tank;
- a second conduit for injecting a second liquid media into the bottom section of the tank, wherein molten sulfur droplets entering the tank in the formation zone forming the sulfur prills; and
- the sulfur prills exiting from the tank through an tank output port attached to the bottom section of the tank.

14. The forming tank of claim 13, wherein the first conduit having a plurality of conduit ports.

15. The forming tank of claim 14, wherein the first conduit comprising a ring.

16. The forming tank of claim 15, wherein the conduit ports spaced along the inside of the ring.

17. The forming tank of claim 14, wherein the first conduit comprising a U-shape.

18. The forming tank of claim 17, wherein the conduit ports spaced along the inside of the U-shape.

19. The forming tank of claim 14, wherein the first conduit comprising a Y-shape.

20. The forming tank of claim 19, wherein the conduit ports spaced along the inside of the Y-shape.

21. The forming tank of claim 13, wherein the first media and the second media are water.

22. The forming tank of claim 21, wherein the first media is relatively cooler than the second media.

23. The forming tank of 13, wherein the tank output port having a cross sectional rectangular shape.

24. The forming tank of claim 13, further comprising a sensor for detecting an amount of the sulfur prills in the tank.

25. The forming tank of claim 13, further comprising a curved screen for removing the water.

26. A system for converting molten sulfur to sulfur prills, comprising:
- a drip tray;
- the molten sulfur traversing to the drip tray forming sulfur droplets;
- a tank storing a liquid media, said liquid media comprising a first media and a second media;
- a first conduit inside the tank for delivering the first media to a first area of the tank;
- a second conduit for delivering the second media to a second area of the tank;
- the sulfur droplets traversing a distance from the drip tray to the liquid media in the tank; and
- relatively spherical shaped sulfur prills formed by the interaction of the sulfur droplets with the media.

27. The system of claim 26, wherein the liquid media, the first media and the second media are water.

28. The system of claim 27, wherein the first media is relatively cooler than the second media.

29. The system of claim 26, wherein the first conduit comprising a Y-shape.

30. The system of claim 27, wherein the first conduit comprising a Y-shape.

31. The system of claim 28, wherein the first conduit comprising a Y-shape.

32. The system of claim 26, wherein the drip tray is positioned over the tank.

\* \* \* \* \*